N. C. CARTER.
Cultivator.
No. 30,295. Patented Oct. 9, 1860.
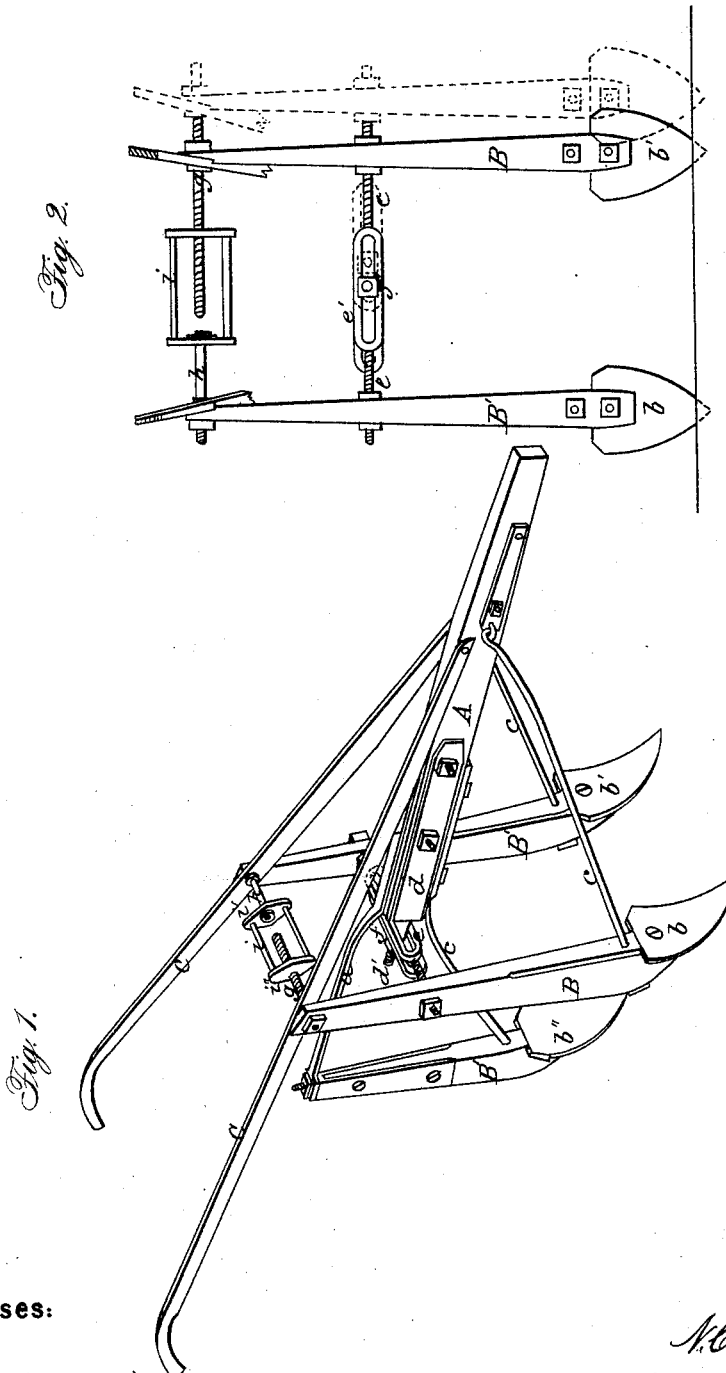
Witnesses:
Inventor:

UNITED STATES PATENT OFFICE.

N. C. CARTER, OF UNION CITY, INDIANA.

IMPROVEMENT IN CULTIVATORS.

Specification forming part of Letters Patent No. 30,295, dated October 9, 1860.

*To all whom it may concern:*

Be it known that I, N. C. CARTER, of Union City, Randolph county, and State of Indiana, have invented certain new and useful Improvements in Cultivators; and I do hereby declare that the following is a full, clear, and exact description thereof, reference being had to the accompanying drawings and letters of reference marked thereon, which drawings, &c., form part of this specification.

My invention consists of a peculiar device for the purpose of regulating the distance between the cultivator teeth or shovels, for the purpose of enabling the same implement to be used successively on different crops where the distance between the drills is various.

In the accompanying drawings, Figure 1 is a perspective view of a cultivator having my regulating device attached. Fig. 2 is a vertical projection of the rear side of front pair of cultivator-arms, showing my regulating device and its operation.

Like letters of reference refer to like parts in both drawings.

A is the draft-beam or shaft of the cultivator, having a backward prolongation or arm, $a$, of iron, for the attachment of the rear cultivator-arm, B''.

B B' B'' are cultivator-arms, having teeth or shovels $b$ $b'$ $b''$, of appropriate form, secured to their lower extremities.

$c$ $c$ $c$ are stay-rods attached respectively to the draft-beam and to the lower part of cultivator-arms.

C C are the arms of the implement. The rear cultivator-arm, B'', is fixed. The two forward ones are capable of being placed wider apart or brought nearer together by means of the device now to be described.

$d$ is a bifurcated iron appendage attached to the rear extremity of draft-beam, terminating rearward in a screw-bolt, $d'$.

$e$ $e$ are two screw bolts or rods, passing each laterally through one of the foremost cultivator-arms, B B', and secured by nuts on either side of arm, and having each a looped head, $e'$, which looped heads overlap each other and receive the screw-bolt $d'$. A nut, $f$, screwed onto the bolt $d'$, serves to confine the looped heads in any position relative to each other in which they may be placed. $g$ is likewise a screw bolt or rod, and $h$ a plain rod, each of which passes laterally through the handles C C and upper part of cultivator-arms B B', and are secured by nuts.

$i$ is a link, drilled at one of its ends, $i'$, for the reception of the extremity of plain rod $h$, which extremity, after being passed through the end $i'$, is provided with a rivet-head and made fast, although the link is left free to rotate thereon. The other end, $i''$, of the link is tapped for the reception of the screw-bolt $h$.

By mere inspection it will be evident that by rotating the link $i$ the upper extremities of the cultivator-arms B B' will be drawn more closely together or forced more widely apart, according to the direction of rotation, and also that by drawing more closely together or forcing apart the looped heads of bolts $e$ the parallelism of the cultivator-arms may be secured at any distance, limited only by the length of the rods and screws and looped heads.

Having described my invention, I will now state what I claim and desire by Letters Patent to secure.

I do not claim a cultivator with adjustable arms; but

I claim—

The arrangement of rods $c$ $c$, rods $e$ $e$, with the looped heads $e'$ $e'$ and terminal screw-bolt $d'$, in combination with rods $g$ and $h$ and screw-link $i$, all constructed and operated in the manner as for the purpose set forth.

N. C. CARTER.

Witnesses:
 WILSON NICKLE,
 THOMAS LEWIS.